Figure 8:
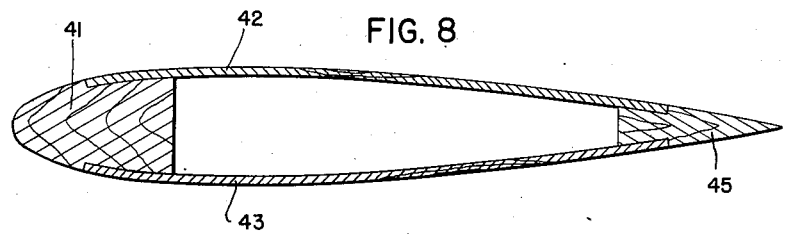

April 12, 1949.  R. W. HESS ET AL  2,467,031
ROTOR BLADE FOR ROTATING WING AIRCRAFT
Filed July 7, 1944  3 Sheets-Sheet 1
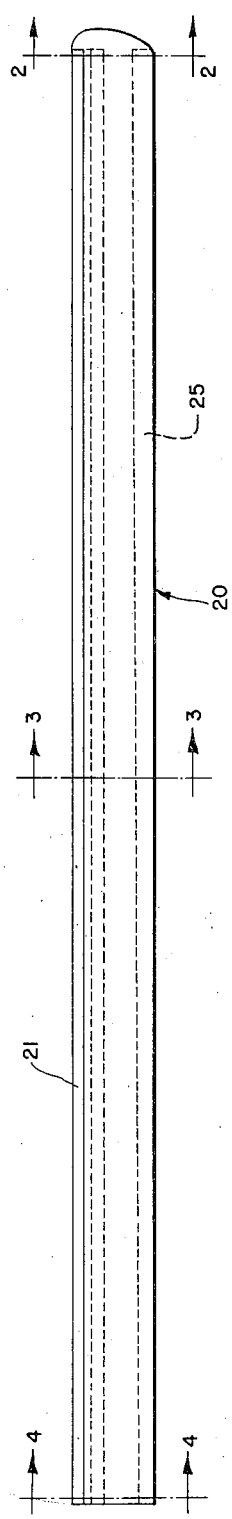
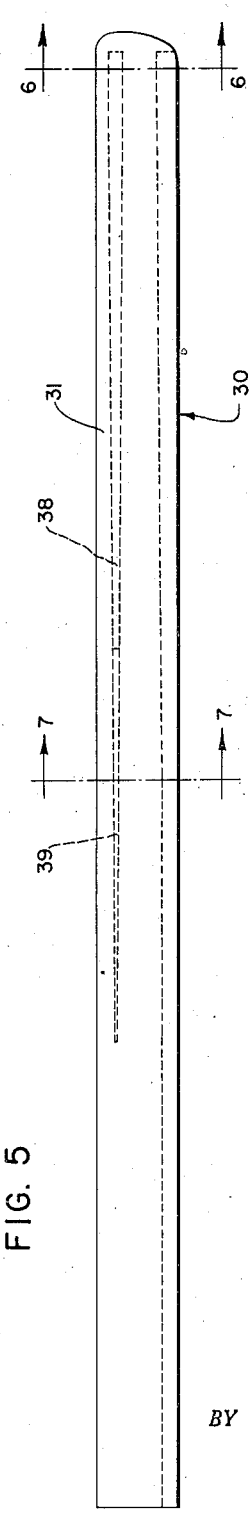
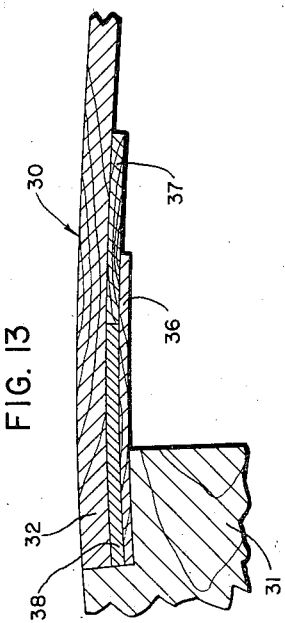
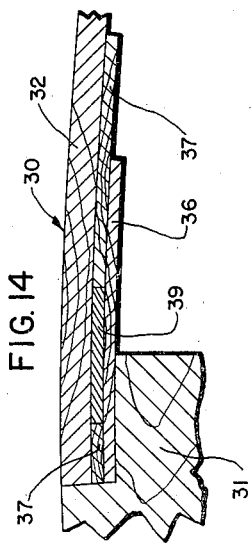
INVENTOR.
ROBERT W. HESS
GEORGE P. MARTIN
BY *W Etack*
ATTORNEY April 12, 1949.  R. W. HESS ET AL  2,467,031
ROTOR BLADE FOR ROTATING WING AIRCRAFT
Filed July 7, 1944  3 Sheets-Sheet 2
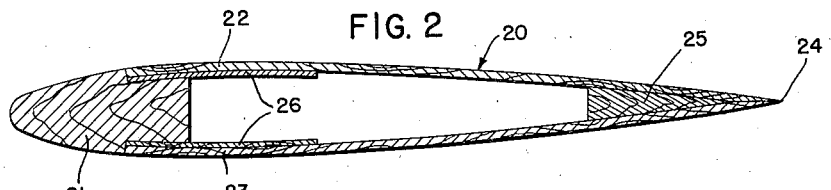
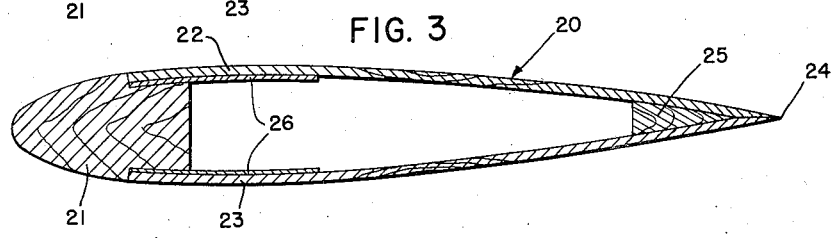
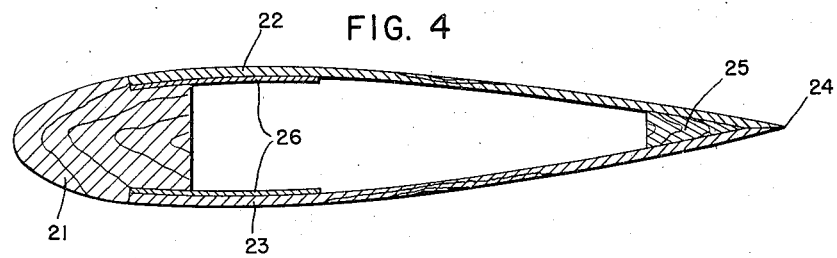
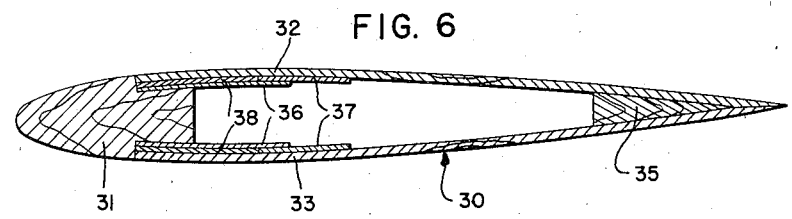
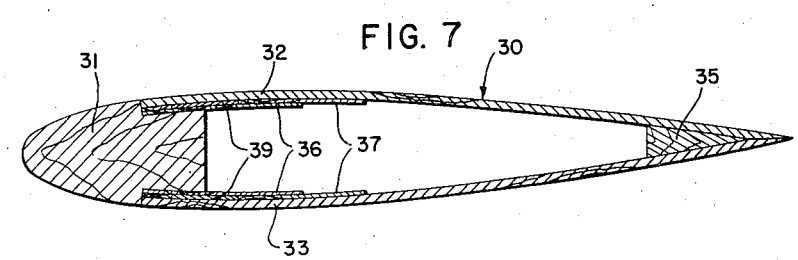
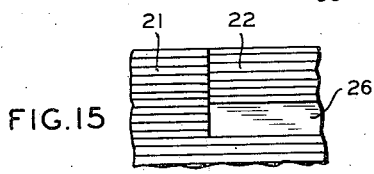
INVENTOR.
ROBERT W. HESS
GEORGE P. MARTIN
BY
ATTORNEY April 12, 1949.   R. W. HESS ET AL   2,467,031
ROTOR BLADE FOR ROTATING WING AIRCRAFT
Filed July 7, 1944   3 Sheets-Sheet 3

INVENTOR.
ROBERT W. HESS
GEORGE P. MARTIN
BY
ATTORNEY

Patented Apr. 12, 1949

2,467,031

UNITED STATES PATENT OFFICE 2,467,031

ROTOR BLADE FOR ROTATING WING AIRCRAFT

Robert W. Hess, Williamsville, and George P. Martin, Buffalo, N. Y., assignors to Curtiss-Wright Corporation, a corporation of Delaware Application July 7, 1944, Serial No. 543,766

3 Claims. (Cl. 170—159)

This invention relates to the construction of airfoil elements. More particularly, it relates to the construction of rotating airfoil elements in rotary wing aircraft, such as helicopters and gyroplanes.

Of recent years a considerable amount of development of rotary wing aircraft, particularly helicopters, has been undertaken. Up to the present time, however, no completely satisfactory structure for rotor blades has been developed, despite the great advances made in general structure and control means. Such blades are subject to stresses which are quite different from those encountered in the conventional stationary or non-rotating wing or other airfoil. Thus, rotor blades are particularly subject to torsional stresses due to rotation and to tension stresses due to centrifugal force. In addition, proper balance of the rotor blade, both aerodynamically and also with respect to mass or weight distribution, is of the utmost importance. In particular, excessive flapping is caused if the center of gravity is located too near the root of the blade (spanwise location). Likewise, the chordwise location of the center of gravity should preferably be at or near the center of lift of the blade which is normally towards the leading edge, in order to reduce torque to a minimum.

It is therefore an object of this invention to provide an improved and simplified form of rotor blade construction for rotary wing aircraft. Another object is to reduce the fabricating costs and number of parts required for the construction of such rotor blades. Still another object is to provide a rotor blade construction in which the location of the center of gravity can be accurately predetermined. Other objects will appear hereinafter.

These objects are accomplished, according to the present invention, by a construction in which the nose section of the rotor blade is solid and is formed of wood, or other organic or inorganic material, impregnated with a binder, built up from thin laminae, and compressed to a predetermined density. The density of this nose portion, for reasons pointed out hereinafter, is not uniform throughout the length of the blade (i. e. spanwise). The trailing edge or aft portion of the blade is of monocoque or semi-monocoque structure, or may be made out of solid material of relatively low density, such as balsa. This structure permits the center of gravity of the rotor to be located at the proper chordwise point, that is, towards the leading edge, and at the same time provides the required strength. The invention may be more easily understood by reference to the accompanying drawings, in which:

Figure 1 is a plan view of a rotor blade constructed in accordance with the present invention. Figures 2, 3 and 4 are sections taken along the lines 2—2, 3—3 and 4—4 respectively, of Figure 1, on a much enlarged scale. Figure 5 is a plan view of modified form of rotor blade in accordance with the present invention. Figures 6 and 7 are sections taken along the lines 6—6 and 7—7, respectively, of Figure 5, on a much enlarged scale. Figures 8, 9, 10, 11 and 12 are sections of still other forms of blade construction according to this invention. Figures 13 and 14 are enlarged details of portions of Figures 6 and 7, respectively. Figure 15 is an enlarged fragmentary view showing a portion of the inner end of the blade shown in Figures 1, 2, 3 and 4.

The compressed nose portion of blades constructed in accordance with the present invention may be of any suitable material, particularly wood, hardwoods, or softwoods. Other materials, however, such as laminated fiberglass, paper, cotton or rayon, may also be used. The nose portion is built up from thin laminae which are adhered together by means of any suitable adhesive. In order to secure the greatest strength, these laminae extend in a horizontal direction. The structure is formed by means well known in the art such as with heat and pressure, which also assists in promotion of adhesion and in polymerization of resinous materials impregnated in the wood. These resinous materials, such as phenolformaldehyde, are incorporated for the purpose of securing additional strength and also for the purpose of increasing the density. The bonding adhesive between the laminae may be any one of those customarily used in the lamination of wood, and may if desired be the same material that is used as an impregnant for the wood.

After formation of the laminated structure, the required size and contour is secured by customary shaping methods, such as by means of sawing, planing, abrading and the like.

The use of thin laminae is advantageous because they permit impregnation of the wood with relative ease and in a relative short amount of time. A suitable thickness has been found to be from 60 to 100 laminae per inch in the finished condition, depending upon the location. Since the greatest stresses occur spanwise of the rotor blade, it is preferred that, in the case of most of the laminae, the grain should run along the length of the blade. A suitable strength distribution, however, is secured by having the grain of every tenth lamina run transversely of the blade.

Referring now to Figures 1, 2, 3 and 4, the rotor blade is indicated generally at 20. It may be provided with any suitable covering, such as a fabric skin. In the drawings, however, for convenience in illustration it is indicated as uncovered. The nose portion 21 of the blade 20 is constructed of compressed and laminated wood. To this nose portion is adhesively secured an upper shell portion 22 and a lower shell portion 23, both extending to the trailing edge of the blade, indicated at 24, and fastened to a trailing edge spar 25. The shell portions 22 and 23 may also be composed of laminated wood, but do not require the employment of high pressures to increase the density. If desired, backing strips 26 may be interposed between the shell portions 22 and 23 and the nose portion 21. The shell portions may be formed flat and sprung inwardly to the required shape, thus placing them under a strain. Preferably, however, they are formed to the required shape in molding presses. They should be of sufficient thickness to give the necessary stiffness to prevent oil-canning and to resist surface deflections under calculated flight loads.

The pressures employed to build up the nose portion may vary within wide limits, as is well known in the art of making laminated compressed wood. The pressures, however, are accurately adjusted so as to secure the required specific gravity, which in general should be in excess of 0.7 (to have the required effect on the location of the center of gravity) and below 1.8 (to prevent too heavy a structure with too high strains). The specific gravity or density, in turn, determines the location of the center of gravity of the blade. As stated previously, it is important to accurately locate the center of gravity, both chordwise and spanwise of the blade. Chordwise, the center of gravity should be located at the chordwise center of lift, to reduce torque in the blade. Spanwise, the center of gravity should be located as near the center of lift or the center of percussion as possible, so that the normal component of the centrifugal force, due to the whirling blade mass, can oppose the center of lift and reduce the bending moment in the blade.

In the normal rotating wing blade construction, the wing tapers in thickness towards the tip, to a certain extent. With such a blade made out of constant density material, the center of gravity would fall inboard of the spanwise midpoint of the blade. Since the center of lift, due to lift forces, is located outboard of the midpoint, it is seen that the bending moment is considerably increased. By the present form of construction, however, the center of gravity can be moved towards the tip of the blade by increasing the degree of compression, and therefore the density of the nose portion as the blade tip is approached. Such a construction is shown in Figures 2, 3 and 4 of the drawings. It is normally not expedient to bring the center of gravity to be coincident with the center of lift, solely by varying the density of the nose portion. In the form shown in Figures 1, 2, 3 and 4, the laminated material comprising the nose portion 21 at the tip of the blade (section shown in Figure 2) is compressed to a specific gravity of 1.35; at the midsection of the blade (section shown in Figure 3) to a specific gravity of 1.10; and at the root of the blade (section shown in Figure 4) to a specific gravity of 0.85. By this construction, the center of gravity is brought to a point approximately midway between root and tip. The location of the center of gravity in the chordwise direction is partially controlled by varying the contour of the trailing edge spar 25, as shown. One arrangement of the laminae for making up a laminated nose portion and laminated shell portion is shown in Figure 15 which is a fragmentary view of the inner end face of the rotor blade at the juncture of nose portion 21, shell 22 and backing strip 26.

In the form shown in Figures 5, 6, 7, 13, and 14, the stiffness of the rotor blade 30 is further increased by the incorporation of metallic strips 38 and 39 (e. g. steel having a specific gravity of 7.9) between the upper shell portion 32 and the compressed nose portion 31 and between the lower shell portion 33 and the nose portion 31. At the tip of the blade (Figure 6) the strip 38 is 0.09 inch thick, while the strip 39 at the midsection (Figure 7) is 0.06 inch thick. The two strips taper continuously in width from the tip to a point somewhat inboard of the mid-section, as shown. From the latter point to the root of the blade no metallic strips are provided. Between the nose portion 31 and the shell portions 32 and 33, respectively, there may be inserted backing strips 36 and filling strips 37 (best shown in Figures 13 and 14), the latter necessary because of the tapering of strips 38 and 39. A trailing edge spar 35 may be employed, as before. As in the form shown in Figures 1 to 4 inclusive, the specific gravity of the nose portion 31 is 1.35 at the tip (section shown in Figure 6), 1.10 at the mid-section (section shown in Figure 7), and 0.85 at the root.

The use of the steel strips 38 and 39 accomplishes two useful purposes: (1) it increases the blade stiffness or resistance to bending at the points where these characteristics are most needed, and (2) it further assists in properly locating the center of gravity. By the form of construction shown, the center of gravity is shifted farther toward the blade tip than without such strips. Instead of steel or other metallic inserts, other types of inserts, such as fiberglass impregnated with synthetic resins or cloth similarly impregnated, may be employed. In general, however, metallic inserts appear to be the most desirable both from the strength and center of gravity viewpoints.

Figure 9:
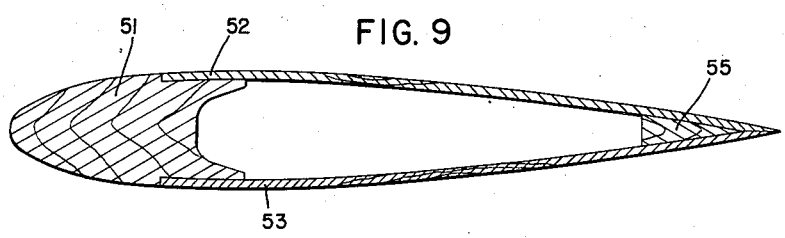

Figures 8, 9, 10, 11 and 12 show various modified forms of blade cross-section according to the invention, all these being taken at the midsection of the blades. Figure 8 shows a form in which the nose portion 41 has a specific gravity of 1.38. In this form the upper shell 42 and the lower shell 43 are not joined together but both are joined to the trailing edge spar 45. Figure 9 employs a differently shaped nose portion 51, with shell portions 52 and 53 and trailing edge spar 55 as before.

Figure 10:
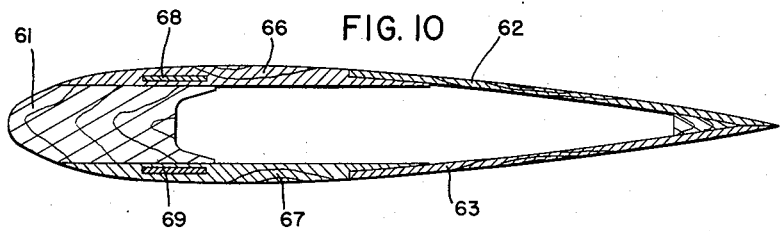

The form shown in Figure 10 employs intermediate upper and lower sections 66 and 67 between the nose portion 61 and the upper and lower shell portions 62 and 63. Steel strips 68 and 69, as in the forms shown in Figures 5, 6 and 7, may be embedded in sections 66 and 67 to assist in the proper location, both chordwise and spanwise, of the center of gravity. Any of the other forms shown may be provided with steel strips.

Figure 11:
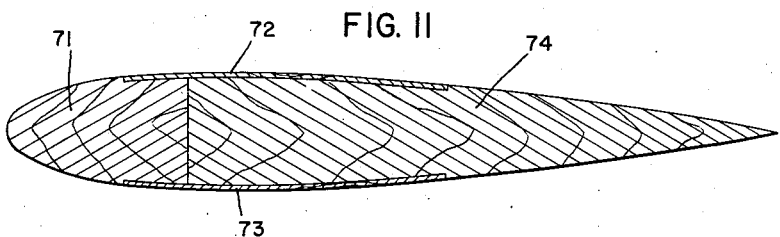

Instead of employing a solid nose portion with a hollow portion aft of the nose, the entire portion aft of the nose may be solid, and constructed out of a low-density wood such as balsa. Such a construction is shown in Figure 11. The nose portion 71 compressed laminated wood is adhered directly to the aft portion 74 of low-density balsa wood. To supplement this adhesion, which is not of great strength at the edge of the laminae, two laminated inserts 72 and 73 are provided on the upper and lower sides of the rotor blades, these inserts being adhered to both the nose portion 71 and the aft portion 74.

Figure 12:
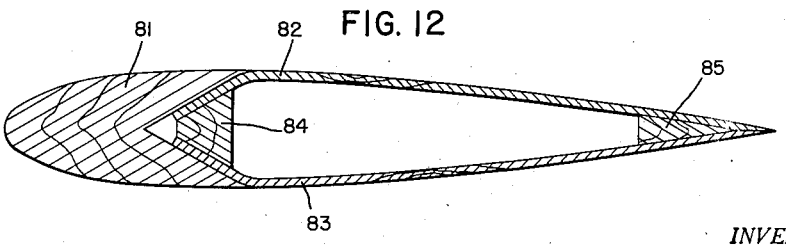

Figure 12 shows a form in which the upper shell portion 82 and the lower shell portion are bent to the inside of nose portion 81. They are kept in place by a spar 84. A trailing edge spar 85 is provided, as before. This construction eliminates the surface butt joint and by its arrangement is likely to be more resistant to dimensional changes brought about by conditions of weathering. The section is also stiffer, since the relatively flexible shell portions are brought into the nose section nearer the chord plane and more of the compressed nose portion 81 is located at the high points of the section.

With the present form of construction, it is seen that it is possible to accurately locate the center of gravity chordwise of the rotor blade merely by compressing the nose portion to a predetermined density. In the process of accomplishing this result, the stiffness and other structural characteristics of the nose portion are greatly improved, so that a suitable rotor blade is secured without the addition of other strengthening members. In addition, the density is also varied to move the center of gravity outward from the root of the blade and to obtain greater stiffness at critical points. By the incorporation of metallic inserts, the center of gravity and stiffness are controlled to a further extent.

The exact desired chordwise location of the center of gravity depends upon the particular shape of airfoil employed, but in general its distance from the leading edge is less than one-third the chord length. With the form shown in the drawings (NACA 0015), the center of gravity is located at a distance from the leading edge approximately 24 per cent of the chord length.

Rotor blades constructed as above described may be covered with a fabric or similar covering, or may be left uncovered. A preferred form of covering, because of the smooth aerodynamic surface furnished thereby, is one of sheet aluminum, which may be firmly adhered or bonded to the novel blade structure of the present invention.

As will be seen from the above description, the present invention has a number of advantages over prior types of construction, both with respect to cost and with respect to functional characteristics. Some of these advantages are as follows:

(1) Appreciable reductions in fabricating costs are possible due to the great reduction in number of parts as compared with the conventional type rotor blades.

(2) Exact airfoil section and contour is obtainable in manufacture through the use of molding and shaping methods.

(3) Rigidity of surfaces maintains the airfoil shape in flight. Oil-canning or appreciable local surface deflection is virtually eliminated by the stiff surfaces possible to attain through this type of construction.

(4) A monocoque type structure may be employed.

(5) The density of the nose portion may be varied to suit the particular blade requirements, including location of center of gravity and degree of stiffness of the blade.

(6) The use of a laminated nose portion permits the density or specific gravity of this nose portion to be varied spanwise of the blade, thus assisting in locating the center of gravity in a spanwise direction.

It is obvious that many changes may be made from the above described embodiments without departing from the spirit of the invention. It is therefore understood that the invention is not to be limited except as defined in the appended claims.

We claim:

1. In an aircraft sustaining rotor blade structure, the combination of a nose portion having a spanwise taper decreasing toward the tip and a substantially constant chordwise section and being formed of laminates compressively bonded and characterized as having a density which increases from root to tip, a trailing edge spar having a spanwise taper decreasing toward the tip and a chordwise section increasing toward the tip, upper and lower laminated shell portions secured to the nose portion and to the trailing edge spar, and metallic stiffener strips positioned one beneath each of the shell portions to lie in spaced, superposed relation for stiffening the rotor blade in bending, the metallic stiffener strips being formed to have a thickness and chordwise dimension which decreases from the tip toward the root of the rotor blade.

2. In an aircraft sustaining rotor blade structure, the combination of a solid nose portion having a spanwise taper in thickness decreasing from root to tip and formed of bonded wood laminae compressed to increase in density from tip to root, upper and lower shell portions secured to the nose portion and extending rearwardly therefrom substantially to the trailing edge of said structure, and metallic stiffener strips increasing in mass per unit length toward the tip of said structure extending spanwise therealong, one of said strips being disposed between said nose portion and each of said shell portions, substantially at the junctures of said shell portions with said nose portion.

3. In an aircraft sustaining rotor blade structure, the combination of a solid nose portion of wood laminae and upper and lower shell portions bonded to said nose portion and extending rearwardly therefrom substantially to the trailing edge of said structure, and metallic stiffener strips embedded in said structure and extending in length spanwise of the latter, one of said strips being disposed substantially at the juncture of each of said shell portions with said nose portion, and each of metallic stiffener strips increasing in cross-section toward the tip of said structure.

ROBERT W. HESS.
GEORGE P. MARTIN.

(References on following page)

REFERENCES CITED

The following references are of record in the file of this patent:

UNITED STATES PATENTS

| Number | Name | Date |
|---|---|---|
| 1,875,597 | Heath | Sept. 6, 1932 |
| 2,076,090 | Myers | Apr. 6, 1937 |
| 2,111,975 | Larsen | Mar. 22, 1938 |
| 2,152,861 | Bennett | Apr. 4, 1939 |
| 2,155,375 | Jablonsky | Apr. 18, 1939 |
| 2,258,134 | Clark | Oct. 7, 1941 |
| 2,272,439 | Stanley et al. | Feb. 10, 1942 |
| 2,303,707 | Pullin | Dec. 1, 1942 |
| 2,315,324 | Gassner | Mar. 30, 1943 |
| 2,362,301 | Pecker | Nov. 7, 1944 |

FOREIGN PATENTS

| Number | Country | Date |
|---|---|---|
| 469,086 | Great Britain | July 19, 1937 |
| 498,674 | Great Britain | Jan. 11, 1939 |
| 588,997 | Germany | Dec. 1, 1933 |